Figure 1:
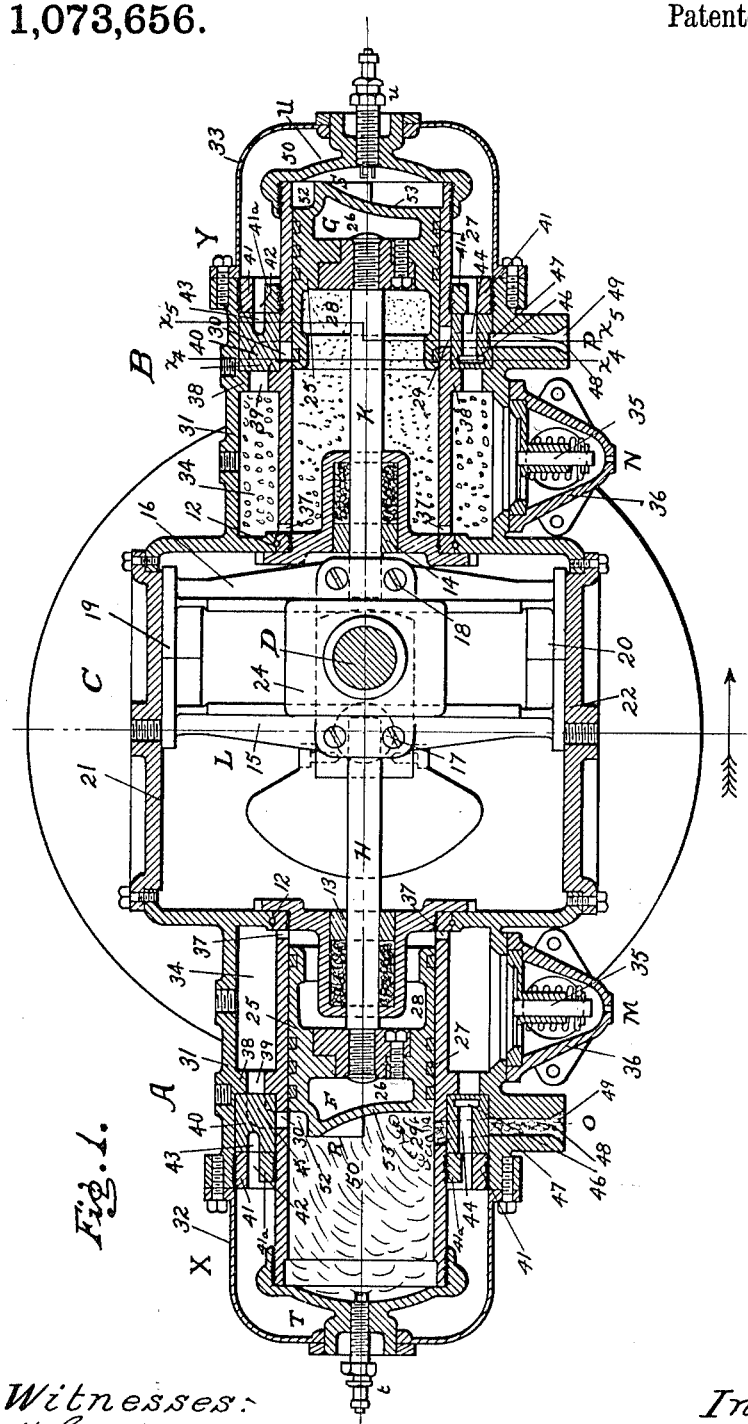

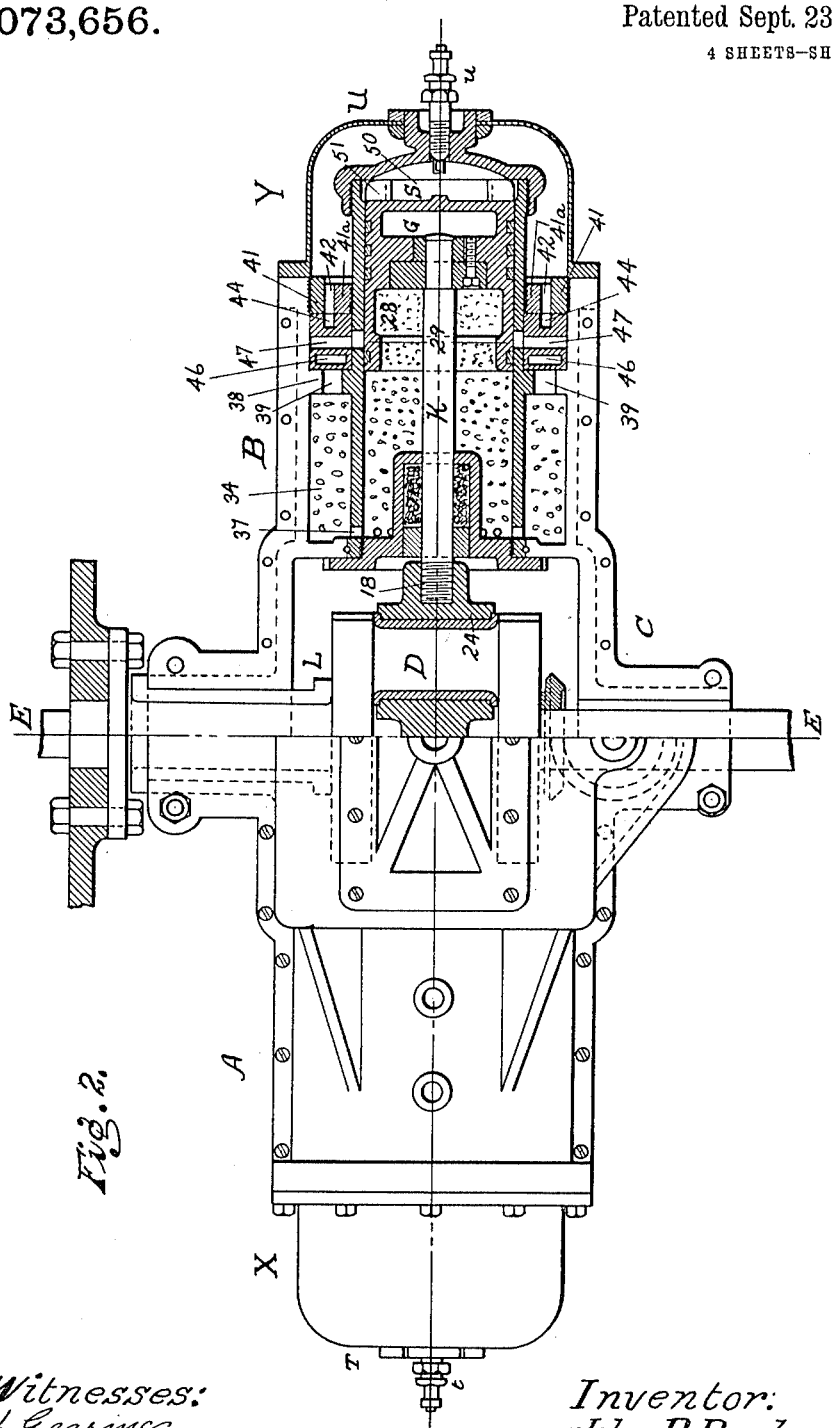

J. P. BARKER.
ENGINE OR MOTOR.
APPLICATION FILED NOV. 6, 1911.
1,073,656.
Patented Sept. 23, 1913.
4 SHEETS—SHEET 3.
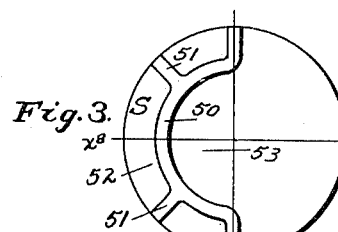
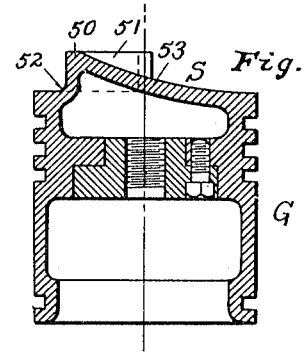
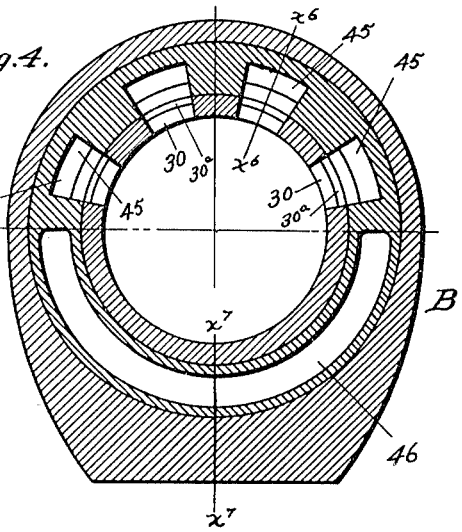
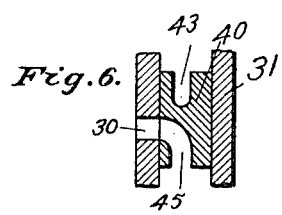
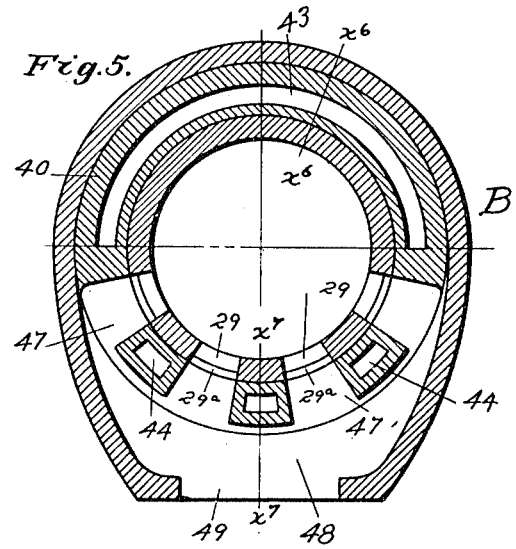
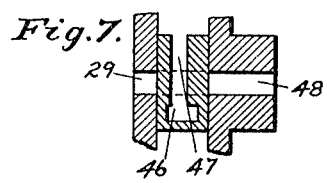
Witnesses.
H. Gearing.
W. F. Seemann
Inventor:
John P. Barker,
By Raymond Ives Blakeslee,
his Attorney.

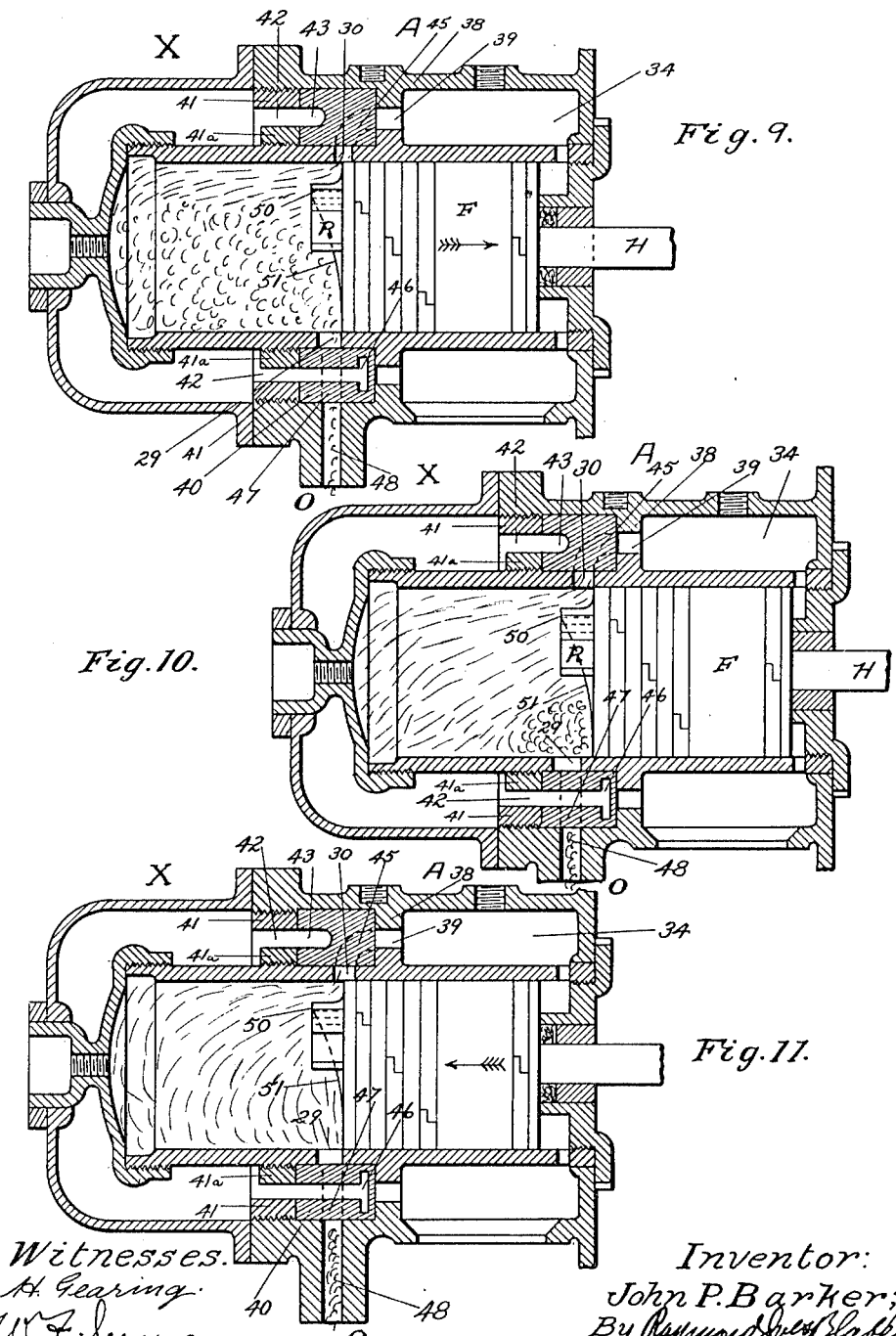

UNITED STATES PATENT OFFICE.

JOHN P. BARKER, OF ORANGE, CALIFORNIA, ASSIGNOR, BY MESNE ASSIGNMENTS, TO ORANGE AUTO POWER COMPANY, A CORPORATION OF CALIFORNIA.

ENGINE OR MOTOR.

1,073,656.  Specification of Letters Patent.  Patented Sept. 23, 1913.

Application filed November 6, 1911. Serial No. 658,829.

*To all whom it may concern:*

Be it known that I, JOHN P. BARKER, a citizen of the United States, residing at Orange, in the county of Orange and State of California, have invented new and useful Improvements in Engines or Motors, of which the following is a specification.

This invention relates to engines or motors, and more particularly to engines or motors of the hydro-carbon explosive type; and the invention has for its object to provide improvements in engines or motors, particularly with respect to the type stated, which will be superior in point of relative simplicity and inexpensiveness of construction and organization, economy of fuel, conservation and increased operative application of energy, compactness of form, facility of control, relative increase of generated power or power units with respect to fuel units, the minimizing of frictional losses, and durability, and which will be generally superior in efficiency and serviceability.

In carrying the invention into practice I provide, in the main, directly opposed cylinders, axially alined, a crank case within which the crank is located between the cylinders, a scotch yoke or the equivalent translating means mounted to reciprocate within the crank casing and operatively associated with the crank, pistons in the cylinders, and piston rods directly and rigidly connecting the respective pistons with the translating means. Each of the cylinders is provided with an exhaust port and an inlet port, or a plurality of each, the condition of which, whether closed or open, or closing or opening, is controlled by the pistons. The inner end of the piston is provided with a deflector whereby the inrush of fresh charge is caused to properly displace the products of combustion, overlying and following the latter on the outward movement of the piston. The mixture is first drawn into a chamber surrounding the outer end of each cylinder and communicating with the closed space in the outer end of the cylinder between the wall of the crank case and the piston, whereby the mixture is churned or ground prior to its introduction within the inner end of the cylinder upon the outward stroke of the piston. The inward stroke of the piston causes the charge to be drawn into said chamber or chambers through a suitable main inlet valve from the carbureter or manifold.

The above is but an outline statement of the general organization of the engine or motor and the inter-relation of its parts and features; and the invention, with the above and other objects in view, and comprising the above general features and elements, consists in the novel provision, construction, organization, combination and relative arrangement of parts, members and features, all as hereinafter described, shown in the drawings and finally pointed out in claims.

In the drawings, Figure 1 is a longitudinal axial sectional view, partly in elevation, of a motor or engine organized in accordance with the invention; Fig. 2 is a similar view, half of the showing being in elevation, the section being taken in a plane at right angles to that of Fig. 1; Fig. 3 is a fragmentary enlarged end view of the inner end of one of the pistons showing the deflector thereon; Fig. 4 is an enlarged transverse sectional view taken upon the line $X^4$—$X^4$, Fig. 1; Fig. 5 is an enlarged transverse sectional view taken upon the line $X^5$—$X^5$, Fig. 1; Fig. 6 is a transverse sectional view taken upon the line $X^6$—$X^6$, Figs. 4 and 5; Fig. 7 is a transverse sectional view taken upon the line $X^7$—$X^7$, Fig. 5; Fig. 8 is a transverse sectional view, taken upon the line $X^8$—$X^8$, Fig. 3; and Figs. 9, 10 and 11 are longitudinal sectional views, partially diagrammatic, taken through one of the cylinders of the motor or engine and its piston, and illustrating the inlet, flow and exhaust of the gaseous charge or mixture and the products of combustion resultant upon explosion thereof.

Corresponding parts in all the figures are denoted by the same reference characters.

Referring with particularity to the drawings, the improved motor or engine, as above stated, comprises two cylinders, A and B, directly opposed at their outer or out-stroke ends, axially, a crank case C disposed directly between and connected with the inner ends of both cylinders, as at 12, a crank D operating within the crank case and a crank shaft E therefor, pistons F and G, within the respective cylinders and directly and rigidly connected by piston rods H and K with translating means L which translating means are also associated with the crank D causing conversion of reciprocation of the pistons and piston rods into rotation of the crank shaft E.

M and N designate respectively inlet means for fresh charges from the carbureter or manifold into the respective cylinders, and O and P designate respectively exhaust means for the respective cylinders. Each of the pistons is provided with a deflector, R and S respectively, which deflectors act to cause the proper reception and flow of the incoming charges for the respective cylinders, such charges being admitted to the cylinders during the activity of the respective exhaust means O and P.

T and U designate respectively the cylinder heads of the cylinders, each of the same being provided with or accommodating ignition means $t$ and $u$ of any preferred type.

X and Y designate respectively water-jacketing means for the cylinders, the same being applied at the in-stroke or compression or explosion ends of the cylinders, and extending into proximity with and for the purpose of cooling the inlet means M and N respectively, and the exhaust means O and P respectively.

A more particular and detail statement of the provision, construction, combination, and relative arrangement of parts and features entering into a preferred embodiment of the invention, inclusive of the above leading features and elements, will now be given.

It is to be understood that there may be a plurality of batteries of cylinders such as A and B, all having a common crank shaft E, each battery having its crank D and translating means L, the crank case C being extended to accommodate the several cranks and the extended crank shaft and the several translating means. The cranks in such series of batteries may be set at any preferred relative angularity, but the same are not shown, nor is any matter duplicated in the showing over and above that necessary and pertinent to one battery comprising two of the cylinders and attendant parts and features, as addition of further batteries and the elements thereof would be mere duplication of the matter concerned in the invention and shown in the drawings.

The crank case C is sealed at all sides so that the translating means and the shaft E and the crank D may operate, if desired, in a lubricating bath. The piston rods H and K operate through stuffing boxes or the like, 13 and 14, set in opposed walls of the crank case. The translating means L preferably comprise in the main a scotch yoke having spaced ways, 15 and 16, directly and rigidly connected with the piston rods H and K, as at 17 and 18, and extend rectangularly with relation thereto, said ways being provided with end caps 19 and 20 tying the ways together and constituting reciprocating bearings mounted to play in ways 21 and 22 on opposed walls of the crank case C. A box 24 is mounted to reciprocate between and in contact with the ways 15 and 16, in a path at right angles to the path of reciprocation of the pistons F and G and their piston rods, such box journaling the crank D. As the ways 15 and 16 reciprocate with the pistons, the box 24 reciprocates in a plane transverse to the plane of reciprocation of the former, causing the rotation of the crank and its shaft E, thus transforming the reciprocation of the pistons and their piston rods into rotation of the crank shaft.

The pistons F and G comprise each the usual cylindrical body 25 each coupled interiorly at its head or in-stroke portion, as at 26, with the respective piston rod, and each having the usual packing rings 27 coacting with the inner wall of the respective cylinder. Within the out-stroke end of each piston, or the end directly opposed to the crank case C, is formed an annular chamber 28 surrounding the respective piston rod.

Opening into each cylinder, and at what will be termed for purposes of definiteness of location and relation the lower portion thereof, are a plurality of exhaust ports 29 included within the exhaust means O or P, and at the upper portion of each cylinder are provided a plurality of inlet ports 30 included within the inlet means M or N, and disposed slightly outwardly of the exhaust ports 29. Each series of ports, 29 and 30, extends substantially half way around the cylinder, and its inner wall, or that lying next to the inner end of the cylinder, is preferably beveled, as at $29^a$ and $30^a$. The inlet means and outlet means M and O are preferably housed by and contained within an annular fitting or jacket 31 surrounding the outer end of the cylinder and coupled at its inner end with the water-jacket shell 32 or 33. The inlet means M or N includes initially an annular passage 34 surrounding the outer end of the cylinder, and receiving the fuel mixture from the carbureter or manifold or other supply means through an inwardly opening check valve 35, tensionally held upon its seat, within a casing 36 depending beneath the jacket 31. This annular passage 34 directly connects with the outer end of the respective cylinder by a plurality of ports 37 in said cylinder, and the chamber 28 in the respective pistons F or G directly communicates with the outer end of the cylinder, or with the major portion of the cylinder when the piston is in the in-stroke position. The annular two part wall 38 at the upper part of each annular passage 34 is provided with a plurality of ports 39, and against the inner face of said wall 38 is fitted an annular plug 40, between the cylinder and the jacket 31, said plug being held in position by two threaded collars or rings 41 and 41ª likewise fitting between the jacket 31 and the cylinder and respectively threaded to the same. These rings are provided with an annular chamber 42 communicating with the interior of the shell 32 or 33 of the respective water-jacket. Said annular chamber 42 likewise communicates with a semi-annular passage 43 in the upper half of the plug 40, and with a semi-annular passage 46 in the lower half of the plug 40. Curved ports 45 in the plugs 40 communicate with the ports 39 in the walls 38 and with the inlet ports 30 leading directly into the cylinders. Each semi-annular passage 46 is provided with a plurality of extensions or pockets 44 intermediate of ports 47 in the plug 40 which connect with the exhaust ports 29 and lead directly into the cylinder. All of the ports 47 communicate, with respect to each of the cylinders, with an exhaust chamber 48 formed in the lower portion of the fitting or jacket 31 communicating, by means of a port 49, with the open air.

Each of the deflectors, R or S, is disposed at the upper portion of the respective piston, referring now to that portion of the piston which in its excursion traverses the upper portion of the cylinder, and comprises in the main a semi-circular flange or web 50, springing from the end of the piston, and having a radius smaller than the piston radius. A plurality of radial webs or flanges 51, extend between the edge of the piston and the web 50 so as to reinforce the latter. The flange 50 merges at its base into the outer end of the piston in a predetermined curved conformation, as at 52; and the radially inner face of the flange 50 merges into the outer end of the piston, as at 53, in an inclined formation, having a well defined curvature adjacent to the base of the flange 50. The supplemental flanges 51 are preferably so spaced apart, and four or more in number, of which the outer two are at the ends of said flange 50, that a wider space exists between the two intermediate flanges than exists between each of said intermediate flanges and the adjacent end flange 51.

The operation, method of use and advantages of the improvements in engines or motors constituting the invention will be readily understood from the foregoing description, taken in connection with the accompanying drawings and the following statement:—The hydro-carbon gaseous fuel mixture is constantly supplied to the inlet means M and N of the respective cylinders and the inlet valves 35 therein, from a carbureter or other suitable source of supply not shown. With the parts in the positions shown in Figs. 1, 2 and 10, the exhaust ports 29 which communicate with the exhaust chamber 48 through the ports 47, and the inlet ports 30 which communicate with the annular passage 34 through the ports 45 and the ports 39, in the cylinder A, are all open, being cleared by the piston F upon its outward movement; and the corresponding ports in the cylinder B are closed by the piston G which is in its position of extreme inward movement in the cylinder B. The products of combustion of the recently produced explosion within the inner end of the cylinder A are therefore evacuating, the cylinder A being thus scavenged through the exhaust ports 29 therein; and a fresh charge of mixture is being received within the inner end of the cylinder A through the inlet ports 30, being properly directed in its reception, so as to cause the proper displacement of the products of combustion, by the deflector R. In the movement of the pistons F and G into the positions under consideration, in a couple, jointly with the translating means L and the rigidly connected piston rods H and K whereby said pistons are connected with the translating means, the exhaust ports 29 of the cylinder A are first opened, after the completed explosion in the outer end of the cylinder, and as soon as said exhaust ports are fully opened, in the bottom half of the cylinder, the inlet ports 30 commence to open in the upper half of the cylinder. When the inlet ports are fully open, the pistons F and G commence to move in the direction the opposite of that indicated by the arrow in Fig. 1, the inlet ports 30 first closing, and the exhaust ports 29 closing immediately thereafter. The series of inlet ports and exhaust ports are so formed and relatively arranged, that in that portion of an excursion of the piston controlling the same during which said ports are opened, namely those phases of the piston excursion immediately preceding and following the reversal of direction of movement of the piston, from its outward stroke to its inward stroke, there is an exhaust capacity provided equal to two and one-half times that of the inlet capacity. With the positions of the parts under consideration, it will be understood that whereas the products of combustion are being scavenged from the cylinder A, and a new charge is being admitted thereto, compression of a new charge is just being completed in the inner end of the cylinder B.

As the operation and sequence of phases of operation attaching to both cylinders is identical, compression taking place in one cylinder while exhaust and re-charge take place in the other, I will take up this sequence of phases, with reference to Figs. 9, 10 and 11 with a complete disclosure thereof, wherein it will be developed that the operative phases including ignition, exhaust, re-charge and compression, in the order stated, are completed in one excursion of each piston, thus providing a complete motor unit of one cylinder in which all the phases of the four-cycle operation are caused and completed in a single piston excursion.

In Fig. 10, as stated, the piston F is shown as in the completed in-stroke position. The exhaust ports 29 have completely opened, prior to the opening of the inlet ports 30. Immediately upon the commencement of opening of the exhaust ports, the products of combustion and burnt gases commence to evacuate from the inner end of the cylinder or the explosion end of the chamber, through the exhaust ports. As soon as the inlet ports commence to be uncovered, in further outward movement of the piston, an influx of fresh mixture is initiated at the upper portion of the cylinder, the exhaust taking place at the lower portion of the cylinder. In Fig. 9 the inlet ports are shown but partially opened, and the exhaust less than half completed, with respect to evacuation of the explosion chamber. As indicated by the whirl lines, the unexhausted products in Fig. 1 have retreated to the lower portion of the explosion chamber adjacent to the exhaust ports, and the overlying fresh gaseous charge, but partially occupying the explosion chamber in Fig. 9, has encroached further upon the interior of said explosion chamber and almost completely occupied the same as shown in Fig. 10. The return movement of the piston, in the direction of the arrow in Fig. 11, the opposite of that indicated in Fig. 9, now commences, and when the piston has reached the position shown in Fig. 11 complete scavenging has occurred, and a complete fresh gaseous mixture charge has occupied the explosion chamber; and, the piston further retreating, exhaust ports and inlet ports are closed, and the confined charge is compressed, such compression being complete when the piston is at the limit of its inward stroke. It will be understood that each fresh charge is drawn from the annular passage 34, which it enters initially through the valve 35, at the bottom of said passage. The charges are drawn off, however, from the top of the passage 34, entering said top portion from the chamber 28 between the piston and the adjacent wall of the crank case C. When the mixture first enters the lower portion of the passage 34, being drawn into the same on the inward stroke of the piston, it enters the chamber 28 wherein it is thoroughly whirled and more completely mixed and, upon the succeeding outward stroke of the piston it is slightly compressed and forced upwardly through the ports 37 at the upper portion of the passage 34 and thence, at the proper phase of operation, through the inlet ports 30 of the explosion chamber, in the slightly compressed condition indicated by the globular showing in Fig. 1.

The deflector, as R, serves upon the introduction of the fresh charge to the cylinder, at which time the exhaust ports 29 are open, to direct the stream of incoming mixture above the exhausting products of combustion, as indicated by the stream lines in Figs. 1, 9, 10 and 11 above and over the products of combustion, whereby it follows that the fresh charge gets behind the retreating products of combustion and thus displaces the same and occupies the explosion chamber as it is evacuated by the products of combustion. The conformation of such deflector 50 is such as to direct the incoming gaseous streams, and preserve their integrity and proper formation, there being formed substantially three initially separate and subsequently merging streams which are first directed as above stated, directly to the inner end of the cylinder, whereby they are deflected or bent back rearward of the retreating products of combustion.

As the pistons F and G are rigidly coupled together through the translating means L, whereby joint reciprocation of the pistons causes reciprocation at an angle of 90° of the box 24 between the reciprocating ways 15 and 16 to operate the crank D and rotate the shaft E, and as the pistons are thereby so inter-related and timed in their movements that one piston has completed its in-stroke when the other piston has completed its out-stroke, it will be manifest that in one cylinder ignition takes place while the other cylinder is completing charge intake and exhaustion of the previous charge and compressing the fresh charge, ignition and explosion in either cylinder being immediately followed by initiation of exhaust and of admission of fresh charge, and ignition in either cylinder immediately following compression.

It is seen, that I obtain all of the phases of four-cycle operation in each cylinder in a single excursion of the piston. Beginning with explosion, when the piston reaches the inner end of the cylinder, outward movement of the piston is followed by initiation of exhaust, which is followed by initiation of inlet of fresh mixture, which in turn is followed upon reversal of piston movement by completion of inlet of fresh mixture and immediate subsequent completion of exhaust. Thereupon, compression takes place followed again by ignition and explosion. I thus obtain with two cylinders the same number of actuating impulses obtained with four cylinders acting upon the Otto four-cycle principle, which requires two complete excursions of each piston for a single impulse. Furthermore, the motor unit comprising two of the opposed cylinders with their alined pistons and piston rods, the latter rigidly connected with the translating means to convert the reciprocation of the pistons into rotation of the crank shaft, is perfectly balanced, the actuating impulses being directly transmitted to the translating means, all as above set forth, the explosion in each cylinder being cushioned by the slight compression in the same cylinder in its chamber 28, and by the compression taking place in the other cylinder. All working valves, with the exception of the automatic valve 35, controlling the initial influx of the gaseous mixture, are absent, the piston itself closing and opening both inlet and exhaust ports. The translating means L serve effectively to convert the reciprocating movement of the pistons into rotating movement of the crank shaft, the ways 16 reciprocating freely at their ends, or by means of the caps or plates 19 and 20 upon the ways 21 and 22 in the crank case. There is no tendency to produce any frictional losses in the operation of the translation means, which acts purely to perform the function indicated, and may be effectively surrounded by a lubricating bath within the crank case.

The water-cooling means X and Y effectively cool the inner ends or explosion chamber ends of the cylinders, and by means of the semi-annular passages 43 and 46, and the pockets 44 respectively leading therefrom, effectively cool the inlet ports 30 and exhaust ports 29 respectively, so that the entire distributing and utilizing system for the explosive mixture, in proximity to the area of high temperature, is maintained at a proper working temperature.

It will be noted that, as has been found in practice, the motor is capable of construction and organization with extreme regard to relative inexpensiveness and simplicity, freedom from liability to derangement of working parts and relations, and that high operative economy and efficiency must therefore flow from utilization thereof.

In conclusion, I do not desire to be understood as limiting myself to the particular construction, organization, formation, combination and relative arrangement of parts, members and features shown and described; but reserve the right to vary the same in adapting the improvements to varying conditions of use, without departing from the spirit of the invention and the terms of the following claims:—

Having thus described my invention, I claim and desire to secure by Letters Patent:—

1. A motor including a cylinder, a piston mounted within the cylinder, an initial charge receiving chamber surrounding the base of the cylinder and communicating with the interior thereof at the back of the piston so that a fresh charge will be drawn into the cylinder upon the compression stroke of the piston, laterally disposed inlet and exhaust ports being provided in the cylinder which are uncovered by the piston upon the outstroke thereof, a water jacket surrounding the explosion end of the cylinder, and an annular plug between the charge receiving chamber and the water jacket, said annular plug being provided with a passage leading from the charge receiving chamber to the inlet port and also with an exhaust passage communicating with the exhaust port of the cylinder.

2. A motor including a cylinder, a piston mounted within the cylinder, an initial charge receiving chamber surrounding the base of the cylinder and communicating with the interior thereof at the back of the piston so that a fresh charge will be drawn into the cylinder upon the compression stroke of the piston, laterally disposed inlet and exhaust ports being provided in the sides of the cylinder, a water jacket surrounding the explosion end of the cylinder, an annular plug between the charge receiving chamber and the water jacket, said plug being formed with a passage leading from the charge receiving chamber to the inlet port of the cylinder and also with an exhaust passage communicating with the exhaust port of the cylinder, the said exhaust passage being surrounded by a pocket which is in communication with the water jacket.

3. A motor including a cylinder, a piston mounted within the cylinder, an initial charge receiving chamber surrounding the base of the cylinder and communicating with the interior thereof at the back of the piston so that a fresh charge will be drawn into the cylinder upon the compression stroke of the piston, the cylinder being provided at opposite sides thereof with laterally disposed inlet and exhaust ports, a water jacket surrounding the explosion end of the cylinder, an annular plug interposed between the charge receiving chamber and the water jacket, said annular plug being provided with a pair of semi-annular passages which communicate with the water jacket and being formed adjacent one of the semi-annular passages with an inlet passage leading from the initial charge receiving chamber to the inlet port and being also formed with an exhaust passage which communicates with the exhaust port of the cylinder and is adapted to be surrounded by water within the other semi-annular passage.

4. A motor including a cylinder, a piston mounted within the cylinder, a casing surrounding the base of the cylinder and providing an initial charge receiving chamber which communicates with the interior of the cylinder at the back of the piston so that a fresh charge will be drawn into the cylinder upon the compression stroke of the piston, laterally disposed inlet and exhaust ports being provided in opposite sides of the cylinder, a water jacket surrounding the explosion end of the cylinder, an annular plug fitted between the before mentioned casing and the cylinder and interposed between the charge receiving chamber and the water jacket, and retaining rings threaded upon the casing and cylinder for holding the plug in position, the said plug being formed with a passage leading from the charge receiving chamber to the inlet port of the cylinder and also with an exhaust passage which communicates with the exhaust port of the cylinder.

In testimony whereof, I have signed my name to this specification in the presence of two subscribing witnesses.

JOHN P. BARKER.

Witnesses:
RAYMOND IVES BLAKESLEE,
C. P. WARDEN.

Copies of this patent may be obtained for five cents each, by addressing the "Commissioner of Patents, Washington, D. C."